United States Patent [19]
Costa

[11] Patent Number: 5,089,192
[45] Date of Patent: Feb. 18, 1992

[54] ASYMMETRIC SEMIPERMEABLE POLY(ARYLETHERKETONE)MEMBRANES AND METHOD OF PRODUCING SAME

[75] Inventor: Lawrence C. Costa, Mansfield, Mass.

[73] Assignee: Ionics, Incorporated, Watertown, Mass.

[21] Appl. No.: 600,633

[22] Filed: Oct. 22, 1990

[51] Int. Cl.$^5$ .................................... B01D 67/00
[52] U.S. Cl. ........................... 264/49; 210/500.23; 210/500.28; 427/245
[58] Field of Search ................ 55/16, 68, 158; 210/500.28, 500.23, 490; 427/244, 245; 264/41, 49

[56] References Cited

U.S. PATENT DOCUMENTS 4,904,426 2/1990 Lundgard et al. ......... 210/500.23 X

Primary Examiner—Frank Spear
Attorney, Agent, or Firm—Norman E. Saliba

[57] ABSTRACT

Asymmetric, semipermeable membranes cast from a solution comprised of poly(aryletherketone) dissolved in a strongly protic non-reactive acid.

14 Claims, 1 Drawing Sheet

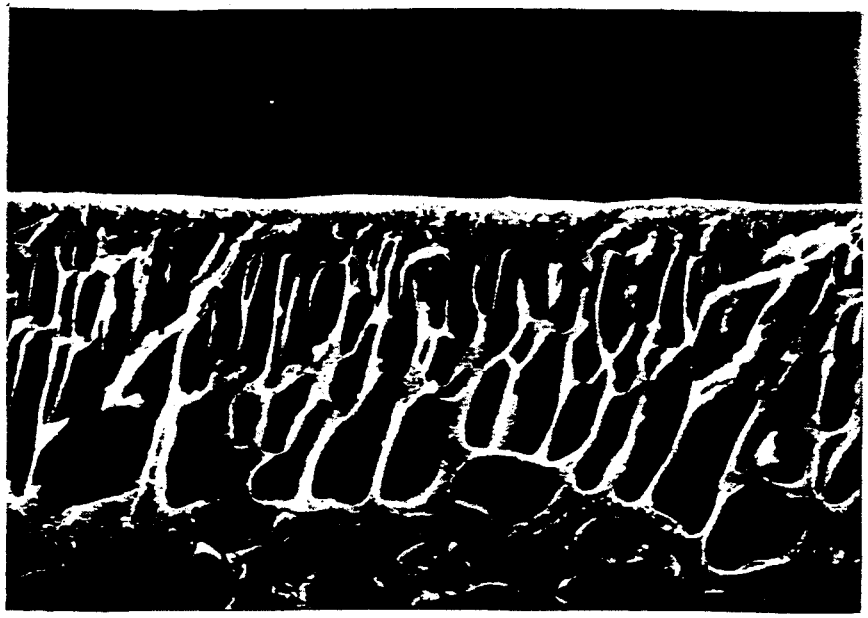

ASYMMETRIC SEMIPERMEABLE POLY(ARYLETHERKETONE)MEMBRANES AND METHOD OF PRODUCING SAME

FIELD OF INVENTION

This invention relates to asymmetric (anisotropic), semipermeable membranes. In particular, it relates to asymmetric, semipermeable membranes derived from poly(aryletherketones) and a method of producing same.

DESCRIPTION OF PRIOR ART

Asymmetric, or anisotropic, semipermeable membranes are well-known. Such membranes are characterized by a porosity gradient such that at least one outer surface of the membrane consists of a relatively thin, dense, finely porous layer supported by a relatively thicker and progressively less dense and more openly porous interior portion.-(See "Handbook of Industrial Membrane Technology", M. C. Porter, ed., Noyes Publications, 1990, pp 12ff.) Due to the relatively thin "skin" layer, such membranes have high hydraulic permeabilities and are useful for separating the components of gaseous and liquid mixtures. The use of such membranes in dialysis, microfiltration, ultrafiltration, reverse osmosis, pervaporation, and membrane-based gas separation processes is commercially well-established.

Asymmetric, semipermeable membranes may be produced from various materials by appropriate methods. Polymers are often preferred materials. Asymmetric, semipermeable membranes have been fabricated from a wide variety of polymers, including cellulose and its derivatives, polyacrylonitrile, polyvinyl chloride, polyvinylidene fluoride, polyamides, polyimides, polysulfones, and poly(arylethersulfones). Preferred membrane polymers are those which produce membranes with high hydraulic permeabilities, well-defined and controllable separation characteristics, good mechanical properties, and resistance to physical and chemical degradation. None of the polymeric materials enumerated above or currently employed in the fabrication of asymmetric, semipermeable membranes embody an optimum combination of physical and chemical membrane properties.

The poly(aryletherketones) constitute a class of engineering thermoplastics with an exceptional combination of desirable membrane properties including excellent combination of heat, physical distortion, and chemical degradation. The insolubility of poly(aryletherketones) in all common solvents has precluded their fabrication into asymmetric, semipermeable membranes by solution casting methods.

Certain substituted derivatives of poly(aryletherketones) (PAEK) do have sufficient solubility to be solution cast into semipermeable membranes. In Offenlegungsschrift DE 3,321,860, a poly(etherketone)(PEEK) is sulfonated in concentrated sulfuric acid, and thereafter the semipermeable membrane is obtained by precipitating the sulfonated poly(etheretherketone) from the sulfuric acid solution. In UK Patent Application GTB 2,216,134A semipermeable membranes are prepared by solution casting blends of sulfonated poly(etheretherketone) and at least one other compatible polymer. In *Chimicaoggi*, volume 7, number 11, 1989, pp 59–63, the preparation of semipermeable membranes by casting solutions of PEEKWC in organic solvents is disclosed. PEEKWC is a soluble poly(aryletherketone) derivative with repeating units of:

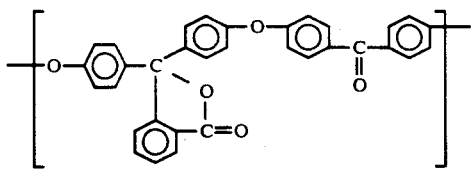

Microporous articles consisting of insoluble semi-crystalline poly(aryletherketones) are disclosed in U.S. Pat. No. 4,721,732. Said articles are prepared from a molecularly compatible blend of a poly(aryletherketone) and a poly(etherimide) by solvent-leaching of the poly(etherimide) component from the blend. Microporous membranes are claimed to be produced by the same method. Said membranes are claimed to have a thickness of from about 1 to about 500 microns. It is clear that membranes prepared according to the teachings of U.S. Pat. No. 4,721,732 consist of a symmetric voided structure, do not possess a porosity gradient from at least one outer finely porous surface into a progressively more openly porous interior portion, and have hydraulic permeabilities which are insufficient to be economically useful in membrane-based separation processes.

SUMMARY OF THE INVENTION

It has now been discovered that semi-crystalline poly(aryletherketones) form stable solutions in strongly protic non-reactive acids, and said solutions possess sufficient viscosity and polymer concentration so that semipermeable membranes derived from said poly(aryletherketones) may be prepared by solution casting procedures. It has further been discovered that the resulting semipermeable membranes are asymmetric in cross-sectional structure, possess high hydraulic permeabilities, possess a superior combination of physical and chemical membrane properties including insolubility in all non-acidic, organic solvents, and are highly efficient when employed in conventional, pressure-driven membrane processes.

BRIEF DESCRIPTION OF THE DRAWING

The FIGURE is a scanning electron photomicrograph at a magnification of 1710× showing the asymmetric cross-sectional structure of the membranes of the present invention.

DETAILED DESCRIPTION OF THE INVENTION

The semipermeable membranes of this invention are comprised of poly(aryletherketones), and are asymmetric in cross-sectional structure. Such membranes may be prepared by solution casting methods, from stable solutions of said poly(aryletherketones) in strongly protic, non-reactive acids.

According to the present invention there is provided an asymmetric, semipermeable membrane comprised of a poly(aryletherketone) or blend of poly(aryletherketones) having repeating units of the formula:

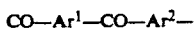

wherein $Ar^1$ and $Ar^2$ are aromatic moieties, wherein at least one aromatic moiety contains a diaryl ether functional group which is a part of the polymer backbone, and wherein both Ar[1] and Ar[2] are covalently linked to the carbonyl groups through aromatic carbon atoms.

Preferably, Ar[1] and Ar[2] are independently selected from unsubstituted phenylene and polynuclear aromatic moieties. More preferably, said phenylene and polynuclear aromatic moieties are covalently linked to the polymer chain through 1, 4, or all para, linkages. Poly(aryletherketones) having the following repeating units are preferred:

The membranes of this invention may be prepared from stable solutions of poly(aryletherketones) in strongly protic, non-reactive acids. For the present invention, strongly protic acids are defined as Bronsted acids of Bronsted acid-Lewis acid mixtures whose Hammett acidity function $H_o$ is more negative than $-5.00$. Preferred acids are those which do not react with, modify, or degrade the poly(aryletherketone) for example, methanesulfonic acid, ethanesulfonic acid, trifluoromethanesulfonic acid, 2,2,2-trifluoroethanesul-

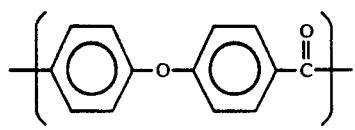

I

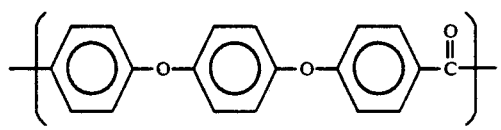

II

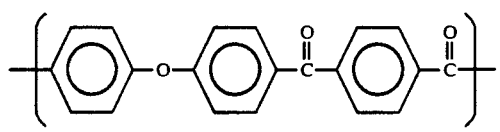

III

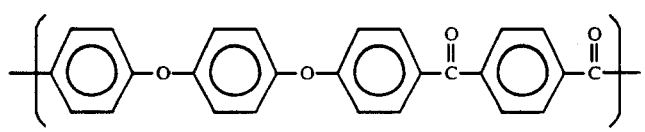

IV

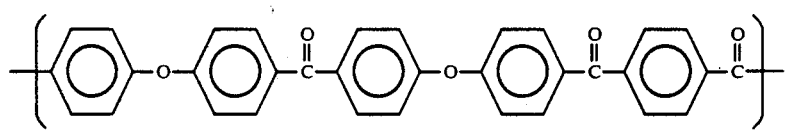

V

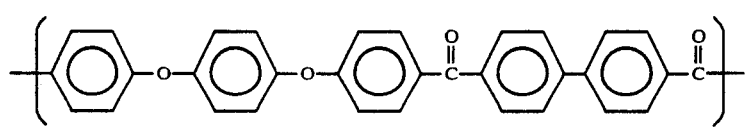

VI

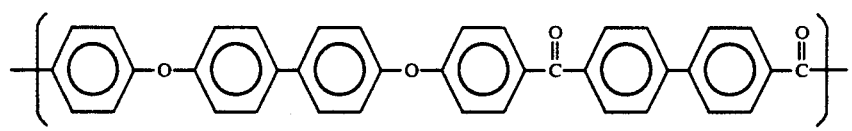

VII

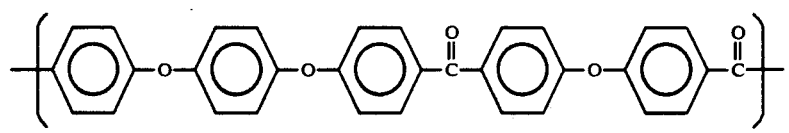

VIII

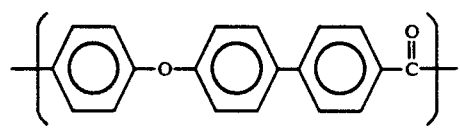

IX

The preferred poly(aryletherketones) of this invention are semi-crystalline, and are insoluble in all non-acidic organic solvents.

fonic acid, and the like. Mixtures of strongly protic acids may also be employed. Particularly preferred is a mixture of methanesulfonic acid and trifluoromethanesulfonic acid. Said solutions may contain from about 5% to about 60%, and preferably from about 10% to about 30% poly(aryletherketone) by weight. Said solutions may also contain optional additives. Preferred additives are those which can alter the average pore size of the resulting membrane, the total porosity of the resulting membrane, or both. Such optional additives are known to the art as "pore forming agents". Suitable additives would be, for example, metal or quaternary ammonium salts of strong protic acids, sulfoxides, sulfones, nitriles, carboxylic acids, sulfides, disulfides, and aralkyl ethers.

The semipermeable, asymmetric membranes of this invention may be prepared by solution-casting methods from stable solutions of poly(aryletherketones) in strongly protic, non-reactive acids. Such solution-casting methods are known in the art, and may comprise, for example, coating said poly(aryletherketone) solution onto a supporting material, and then immersing said coated material into a fluid which causes the poly(aryletherketone) to precipitate and form the membrane. Suitable supporting materials include, for example, glass, paper, metal, woven and non-woven fabrics, and porous tubes. Alternatively, the above said poly(aryletherketone) solution may be extruded through an annular orifice into a precipitation fluid so that the resulting membrane is in the form of a self-supporting hollow fiber. Any fluid which is miscible with the strongly protic acid and optional additives, and is not a solvent for the poly(aryletherketone), will be a suitable precipitation fluid. A preferred precipitation fluid is water.

The membranes of the present invention possess an asymmetric, or anisotropic, cross-sectional structure. Such membranes are characterized by a porosity gradient such that at least one outer surface of the membrane consists of a relatively thin, dense, finely porous layer supported by a relatively thicker and progressively less dense and more openly porous interior portion. Such a structure is depicted in the FIGURE. Asymmetric membranes possess significantly greater hydraulic permeabilities than symmetric membranes of the same thickness since the resistance to flow in an asymmetric membranes is largely confined to the ultra-thin, finely porous skin layer. The asymmetric membranes of the present invention possess finely porous skin layers of about 0.05-1.0 microns, and preferably from about 0.1-0.5 microns as determined by scanning electron microscopy.

The following examples are representative of the present invention but are not intended to be limiting:

EXAMPLE 1

A solution was prepared from 20 g Victrex ® poly(etherketone)(PEEK)(grade 220G; ICI Advanced Materials; structure I), 120 mL methanesulfonic acid and 10 mL of trifluoromethanesulfonic acid. The resulting dark red, viscous, homogeneous solution was coated onto a woven polyester fabric at a thickness of 6 mils. The thus coated fabric was immediately immersed into water at 49° F. for 2 minutes, and then immediately transferred into water at 125° F. for 10 minutes. The resulting off-white membrane was uniform in appearance with occasional minor pinhole defects. Sample disks (44 mm diameter) were cut randomly from the membrane and tested in an Amicon model 8050 stirred cell for pure water permeability (PWP). The membrane of this example had a PWP of 2010±308 GFD at 50 psi. Sample disks were also tested for macrosolute rejection in the same stirred cell. Test solutions of individual macrosolutes were made up to 1000 ppm and then concentrated by a factor of 2 by filtration through the membrane. The results are shown in Table 1.

TABLE 1

| Macrosolute | MW (Daltons) | % Rejection* |
| --- | --- | --- |
| Gamma-Globulin | 160,000 | 4 ± 5 |
| Apoferritin | 443,000 | 17 ± 2 |
| Blue Dextran | 2,000,000 | 41 ± 11 |

*% Rejection determined from remaining macrosolute in the retentate.

EXAMPLE 2

The general preparative and testing procedure of Example 1 were repeated using instead a solution of 30 g Victrex ® PEK, 15 mL trifluoromethanesulfonic acid, and 120 mL methanesulfonic acid. This solution was coated at a thickness of 5 mils onto a non-woven polyolefin fabric and immediately immersed in 62° F. water for 10 minutes. The resulting membrane was extremely uniform in appearance and did not contain any visible defects. This membrane had a PWP of 1348±62 GFD at 50 psi. Macrosolute rejection data are shown in Table 2.

TABLE 2

| Macrosolute | MW (Daltons) | % Rejection* |
| --- | --- | --- |
| Myoglobin | 17,400 | 93 ± 2 |
| BSA | 67,000 | 99 ± 1 |
| Blue Dextran | 2,000,000 | 99.1 ± 0.2 |

*% Rejection determined from macrosolute concentration in the filtrate.

The membrane of example 2 shows the high PWP and high rejection of macrosolutes characteristic of asymmetric ultrafiltration membranes.

EXAMPLE 3

The procedures of Example 1 were repeated using instead a solution of 30 g Victrex ® poly(etherketone) (PEEK)(grade 450 P; ICI Advanced Materials; structure II), 15 mL trifluoromethanesulfonic acid, and 120 mL of methanesulfonic acid. The homogeneous, mahogany solution was coated at a thickness of 5 mils onto a non-woven polyester fabric and immediately immersed into 60° F. water for 2 minutes and 125° F. water for 5 minutes. The resulting membrane was very uniform in appearance and contained no visible defects. This membrane had a PWP of 240±13 GFD at 50 psi. Macrosolute rejection data are shown in Table 3.

TABLE 3

| Macrosolute | MW (Daltons) | % Rejection* |
| --- | --- | --- |
| Myoglobin | 17,400 | 78 ± 5 |
| Bacitracin | 1,422 | −7 ± 0.9 |

*% Rejection determined from macrosolute concentration in the retentate. The negative rejection indicates that none of the material was rejected by the membrane, and a portion of the material was absorbed by the membrane.

EXAMPLE 4

The procedures of Example 1 were repeated using instead a solution of 22.5 g Victrex ® PEK (I), 7.5 g Victrex ® PEEK(II), 1.0 g sodium methanesulfonic, 18 mL of trifluoromethanesulfonic fluoromethanesulfonic acid, and 145 mL methanesulfonic acid. This solution was coated at a thickness of 5 mils onto a non-woven polyolefin fabric and immediately immersed into a 55° F. water for 8 minutes. The resulting membrane was uniform in appearance with an occasional pinhole defect. This membrane had a PWP of 3151±243 GFD at 50 psi. Macrosolute rejections were determined from the filtrates: Myoglobin=55%±17%; BSA=95%±2%; Blue Dextrean=98.5%±0.5%.

EXAMPLE 3

The procedures of Example 1 were repeated using instead a solution of 30 g Ultrapek ® KR4176 (BASF; Structure V), 30 mL trifluoromethanesulfonic acid, and 125 mL of methanesulfonic acid. This solution was coated at a thickness of 6 mils onto a non-woven polyolefin fabric and immediately immersed into 68° F. water for 20 minutes. The resulting off-white membrane was uniform in appearance and contained no visible defects. This membrane had a PWP of 1558±174 GFD at 50 psi.

EXAMPLE 6

The membranes from Examples 2, 3, and 4 of this invention were immersed in various solvents for 24 hours and then retested for PWP. For comparative purposes, a commercial poly(ethersulfone) membrane(PTTK; Millipore Corp.) was subjected to the same procedures. Results are shown in Table 4.

TABLE 4

| Membrane | PWP (GFD/50 psi after 24 hour solvent immersion) | | |
|---|---|---|---|
| | Acetone | Dixylylethane | N-methyl-pyrrolidone |
| Present Invention: | | | |
| Example 2 | 1239 ± 89 | 906 ± 104 | 996 ± 98 |
| Example 3 | 200 ± 31 | 163 ± 40 | 148 ± 18 |
| Example 4 | 2912 ± 203 | 2489 ± 291 | 1826 ± 324 |
| Millipore PTTK (polyethersulfone) | <10 | 0 | dissolved |

It can be seen that the PAEK membranes of this invention are substantially unaffected by 24-hour immersion in the above selected solvents, while a commercial poly(ethersulfone) membrane is completely plasticized or dissolved by the same treatments.

While some embodiments of the present invention have been shown described herein, it will be apparent to those skilled in the art that various modifications and changes can be made without departing from the spirit and scope of the present invention. All such modifications and changes coming within the scope of the appended claims are intended to be covered thereby.

I claim:

1. A process of forming an asymmetric semipermeable membrane by casting a solution comprising a poly(aryletherketone)(PAEK) or mixtures of poly(aryletherketones) dissolved in strongly protic nonreactive acids, said PAEK having repeating units of the formula:

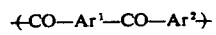

wherein $Ar^1$ and $Ar^2$ are aromatic moieties, wherein at least one aromatic moiety contains a diaryl ether functional group which is a part of the polymer backbone, and wherein both $Ar^1$ and $Ar^2$ are covalently linked to the carbonyl groups through aromatic carbon atoms.

2. The process of claim 1 wherein $Ar^1$ and $Ar^2$ are independently selected from unsubstituted phenylene and polynuclear aromatic moieties.

3. The process of claim 2 wherein said phenylene and polynuclear aromatic moieties are covalently linked to the polymer chain through 1, 4, or all para, linkages.

4. The process of claim 1 wherein said poly(aryletherketone) is selected from said repeating units and mixtures thereof of the following:

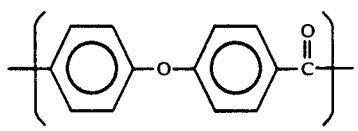

I

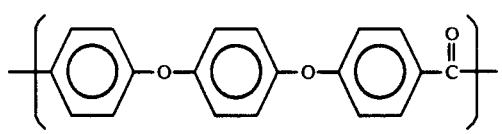

II

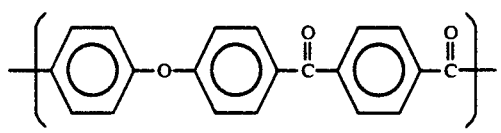

III

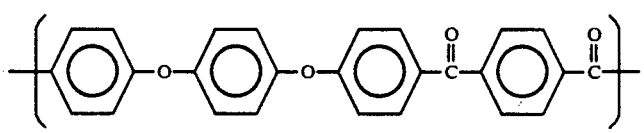

IV

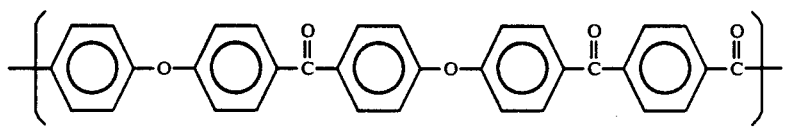

V

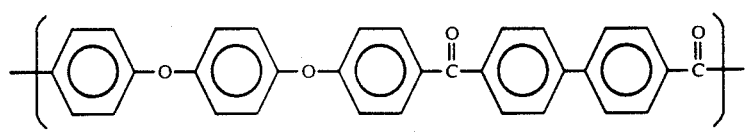

VI

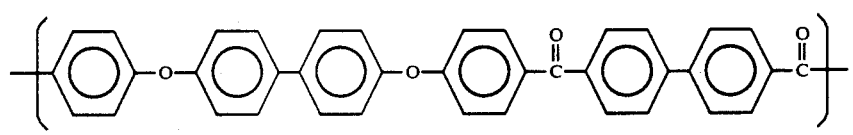

VII

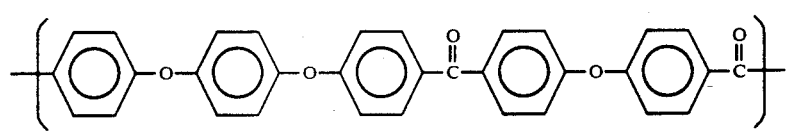

VIII

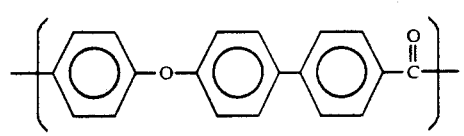

IX

5. The process of claim 1 wherein said poly(aryletherketone) is semi-crystalline and substantially insoluble in non-acidic organic solvents.

6. The process of claim 1 wherein said strongly protic non-reactive acid is selected from the group consisting of methanesulfonic acid, ethanesulfonic acid, trifluoromethanesulfonic acid, 2,2,2-trifluoroethanesulfonic acid, and mixtures thereof.

7. The process of claim 1 wherein said solution contains between about 5% to 60% by weight of PAEK.

8. The process of claim 1 wherein said solutions contains pure forming agents.

9. The process of claim 8 wherein said pore forming agent is selected from the group consisting of metal or quaternary ammonium salts of strong protic acids, sulfoxides, sulfones, nitriles, carboxylic acids, sulfides, disulfides, aralkyl ethers and mixtures thereof.

10. The process of claim 1 wherein said solution is cast onto supporting material.

11. The process of claim 10 wherein said supporting material is selected from the group consisting of glass, paper, metal, woven and non-woven fabrics, and porous tubes.

12. The process of claim 1 wherein said membrane is a hollow fiber semipermeable membrane.

13. A process of casting an asymmetric semipermeable membrane comprising coating a fabric support material with a solution containing between about 10% to 30% by weight of PAEK in a mixture of methanesulfonic acid/trifluoromethanesulfonic acid, thereafter immersing said coated support material into a precipitation fluid to form the membrane.

14. The process of claim 13 wherein the said PAEK is selected from the group consisting of PEK, PEEK, and mixtures thereof and said precipitation fluid is water.

* * * * *